United States Patent [19]
Wood, Jr. et al.

[11] Patent Number: 6,144,916
[45] Date of Patent: *Nov. 7, 2000

[54] ITINERARY MONITORING SYSTEM FOR STORING A PLURALITY OF ITINERARY DATA POINTS

[75] Inventors: Clifton W. Wood, Jr.; John R. Tuttle, both of Boise, Id.

[73] Assignee: Micron Communications, Inc., Boise, Id.

[ * ] Notice: Under 35 U.S.C. 154(b), the term of this patent shall be extended for 593 days.

[21] Appl. No.: 08/581,937

[22] Filed: Jan. 2, 1996

Related U.S. Application Data

[63] Continuation-in-part of application No. 08/422,007, Apr. 11, 1995, Pat. No. 5,572,226, which is a continuation of application No. 07/884,507, May 15, 1992, abandoned, and a continuation-in-part of application No. 08/137,677, Oct. 14, 1993, abandoned, which is a continuation-in-part of application No. 07/899,777, Jun. 17, 1992, abandoned, and a continuation-in-part of application No. 08/489,185, Jun. 9, 1995, abandoned, which is a continuation of application No. 08/123,030, Sep. 14, 1993, Pat. No. 5,448,110, which is a continuation-in-part of application No. 07/899,777, Jun. 17, 1992, abandoned, and a continuation-in-part of application No. 08/168,909, Dec. 17, 1993, Pat. No. 5,497,140, which is a continuation of application No. 07/928,899, Aug. 12, 1992, abandoned, and a continuation-in-part of application No. 07/990,915, Dec. 15, 1992, Pat. No. 5,500,650, and a continuation-in-part of application No. 08/263,210, Jun. 21, 1994, Pat. No. 5,583,850, which is a continuation of application No. 07/990,918, Dec. 15, 1992, Pat. No. 5,365,551.

[51] Int. Cl.[7] .................................................. G06F 165/00
[52] U.S. Cl. ........................ 701/200; 701/210; 701/214; 340/993
[58] Field of Search ................................ 364/443, 449.1, 364/449.7, 449.8; 340/902, 905, 989, 993; 455/42, 53.1, 54.1, 54.2, 96; 342/46, 51, 58, 457; 354/443, 449.1, 449.7, 449.8; 701/200, 207, 213, 214

[56] References Cited

U.S. PATENT DOCUMENTS

| | | | |
|---|---|---|---|
| 4,797,948 | 1/1989 | Milliorn et al. | 455/54.2 |
| 4,908,629 | 3/1990 | Apsell et al. | 342/457 |
| 5,030,807 | 7/1991 | Landt et al. | 342/44 |
| 5,055,659 | 10/1991 | Hendrick et al. | 342/44 |
| 5,119,102 | 6/1992 | Barnard | 342/515 |
| 5,153,836 | 10/1992 | Fraughton et al. | 364/461 |

(List continued on next page.)

OTHER PUBLICATIONS

"Beta Test Site and Non–Disclosure Agreement" executed May 27, 1993 between Micron Communications, Inc. and U.S. Department of Transportation (2 pages); Attachment A (1 page); Attachment J.2, "Memo of Understanding" form (1 page).

DOT contract No. DTRS–57–93–C–00081 executed Jun. 16, 1993 (pp. 1–2, 8 and 19); Attachment J.1, "Procurement Request 35–0226 Statement of Work" (3 pages).

Modification No. 1 to DOT contract No. DTRS–57–93–C–00081 executed Aug. 8, 1994 (4 pages); Statement of Work (4 pages).

"VNTSC Intransit GPS Tag System General Description" dated Aug. 18, 1994, sent by Micron Communications to its subcontractor Compunetics (2 pages).

"VNTSC Intransit GPS Tag System General Description" dated Oct. 7, 1994, sent by Micron Communications to its subcontractor Compunetics (2 pages).

(List continued on next page.)

*Primary Examiner*—Tan Nguyen
*Attorney, Agent, or Firm*—Robert J. Stern

[57] ABSTRACT

Method and apparatus for a base station or interrogator station to monitor the itinerary of one or more vehicles or other movable assets. Each vehicle or other movable object includes a satellite navigation receiver with circuitry for computing the geographic position of the object, and a memory for storing a history of positions computed at a number of different times during the itinerary of the object. Each movable object further includes a radio transceiver which transmits the stored position history to the base station.

11 Claims, 1 Drawing Sheet

U.S. PATENT DOCUMENTS

| | | | |
|---|---|---|---|
| 5,202,829 | 4/1993 | Geier | 364/449 |
| 5,208,756 | 5/1993 | Song | 364/449.1 |
| 5,221,925 | 6/1993 | Cross | 340/988 |
| 5,223,844 | 6/1993 | Nansell et al. | 342/357 |
| 5,392,052 | 2/1995 | Eberwine | 342/357 |
| 5,414,432 | 5/1995 | Penny, Jr. et al. | 342/357 |
| 5,432,841 | 7/1995 | Rimer | 379/59 |

OTHER PUBLICATIONS

Letter dated Mar. 12, 1996 from Micron Communications to Mr. David Reed, U.S. Department of Transportation (1 page).

Micron Communications invoice 17–4620AR dated 4/11/95 (1 page).

ITINERARY MONITORING SYSTEM FOR STORING A PLURALITY OF ITINERARY DATA POINTS

CROSS REFERENCE TO RELATED APPLICATIONS

This patent application is a continuation-in-part of the following U.S. patent applications:

(1) Ser. No. 08/422,007 filed Apr. 11, 1995 as a continuation of application Ser. No. 07/884,507 filed May 15, 1992, now abandoned;

(2) Ser. No. 08/137,677 filed Oct. 14, 1993, which is a continuation-in-part of Ser. No. 07/899,777 filed Jun. 17, 1992, now abandoned;

(3) Ser. No. 08/489,185 filed Jun. 9, 1995 as a continuation of Ser. No. 08/123,030 filed Sep. 14, 1993, now U.S. Pat. No. 5,448,110, which is a continuation-in-part of Ser. No. 07/899,777 filed Jun. 17, 1992, now abandoned;

(4) Ser. No. 08/168,909 filed Dec. 17, 1993 U.S. Pat. No. 5,497,140 as a continuation of Ser. No. 07/928,899 filed Aug. 12, 1992, now abandoned;

(5) Ser. No. 07/990,915 filed Dec. 15, 1992; and U.S. Pat. No. 5,500,650

(6) Ser. No. 08/263,210 filed Jun. 21, 1994 U.S. Pat. No. 5,583,850 as a continuation of Ser. No. 07/990,918 filed Dec. 15, 1992, now U.S. Pat. No. 5,365,551.

FIELD OF THE INVENTION

The invention relates to monitoring systems by which a base station monitors the location of one or more vehicles or other mobile objects by means of a conventional satellite navigation system.

BACKGROUND OF THE INVENTION

Many business activities involve a fleet of vehicles or other movable assets traveling to a number of destinations under the management of a central headquarters or base station. Examples include fleets of delivery trucks and railroad trains. Management and dispatching personnel at the base station generally desire the capability to monitor the itinerary actually traveled by each mobile unit. Such monitoring capability would permit managers and dispatchers to confirm whether the mobile unit deviated from a prescribed itinerary, or whether the driver violated regulations regarding speed limits or required periods of rest.

Various systems have been used to monitor fleets of mobile units by means of the U.S. Government operated G.P.S., Navstar, Argos, and Loran satellite navigation systems. Examples are described in U.S. Pat. No. 5,119,102 issued Jun. 2, 1992 to Barnard; and U.S. Pat. No. 5,223,844 issued Jun. 29, 1993 to Mansell et al.

However, conventional systems by which a base station monitors the itineraries of one or more mobile units generally require the mobile units to remain in continuous or frequent radio communication with the base station. Such systems cannot monitor the itinerary of a mobile unit which travels out of communication range of the base station. Even systems which communicate via public cellular telephone networks cannot function when a mobile unit travels to a rural location lacking cellular telephone service.

Therefore, a need exists for a system which monitors the itinerary of a mobile unit even when the mobile unit does not communicate with the base station during all or a portion of its travels.

A similar need exists for tracking stolen goods by law enforcement personnel. As described in U.S. Pat. No. 4,908,629 issued Mar. 13, 1990 to Apsell et al., systems have been developed for locating a stolen automobile in which a police transmitter commands a transceiver hidden in the stolen automobile to begin transmitting a radio beacon so that it can be located using direction finding receivers. However, it would be desirable if the stolen automobile could transmit its geographical coordinates instead of a mere beacon. It would be even more desirable if the stolen automobile could store a history of all locations it has traversed (i.e., its itinerary) to help the police find the thieves and their accomplices. The same need exists for tracking any other type of valuable, movable asset.

SUMMARY OF THE INVENTION

The invention is a method and apparatus for a base station or interrogator station to monitor the itinerary of one or more vehicles or other movable assets. Each vehicle or other movable object includes a satellite navigation receiver with circuitry for computing the geographic position of the object, and a memory for storing a history of positions computed at a number of different times during the itinerary of the object. Each movable object further includes a radio transceiver which receives commands from the base station and which downloads the stored position history to the base station in response to an interrogation command.

Advantageously, the invention permits the interrogator station to determine the itinerary of each movable object, including its itinerary during periods when the vehicle or object is not within radio communication range of the base station.

The interrogator station may be a dispatching center, warehouse, or shipping dock to which the vehicle or other movable object returns periodically. In that case, the interrogator station would only interrogates the object when it returns to the base station after completing its itinerary.

Alternatively, there may be a number of interrogator stations which the mobile object passes by, or stops at, during its itinerary. For example, a vehicle being monitored may stop at a number of different shipping docks, and each dock may include a interrogator station which downloads from the vehicle its itinerary since it left the last dock. As another example, the interrogator stations may be checkpoints positioned at intervals along a railway route or water way to monitor the travels of railroad cars or water vessels, respectively.

Unlike conventional systems in which a base station continuously tracks the position of a mobile unit, in the present invention there is no need for communication between the interrogator and the mobile unit while the mobile unit is away from the interrogator. This eliminates the need for either a large network of RF repeater transceivers or expensive communications over cellular telephone or satellite links.

Furthermore, because the interrogator and mobile unit only have to communicate over a short distance, neither the interrogator nor the mobile unit needs a large antenna or a high power RF transmitter as required in many conventional systems. In fact, the transmitter section of either the interrogator or the mobile unit can be a passive transmitter which derives all or most of its operating power from received RF signals, such as a conventional modulated backscatter transmitter, which modulates a received RF signal and reflects it back to the sender. Eliminating the need for high transmitter power is especially important in applications in which the interrogator or the mobile unit must rely on battery power.

Such a modulated backscatter transmitter is preferred for a mobile unit which is being monitored surreptitiously (that is, without the knowledge of the operator or custodian of the mobile unit). Because such a transmitter only responds to received RF signals, it is difficult to detect by an RF detector ("RF sniffer"). It is further preferable that the mobile unit only transmits a radio signal in response to a command, received from an interrogator, which is specifically addressed to an identification code assigned to that mobile unit.

When used to track stolen goods, the interrogator station could be implemented in a police vehicle. Since the transceiver in the stolen object need not transmit any radio signals to the interrogator station until interrogated by the interrogator station, the thief likely would not discover the transceiver until after its location history already had been transmitted to the police.

DETAILED DESCRIPTION OF THE PREFERRED EMBODIMENTS

Figure 1:
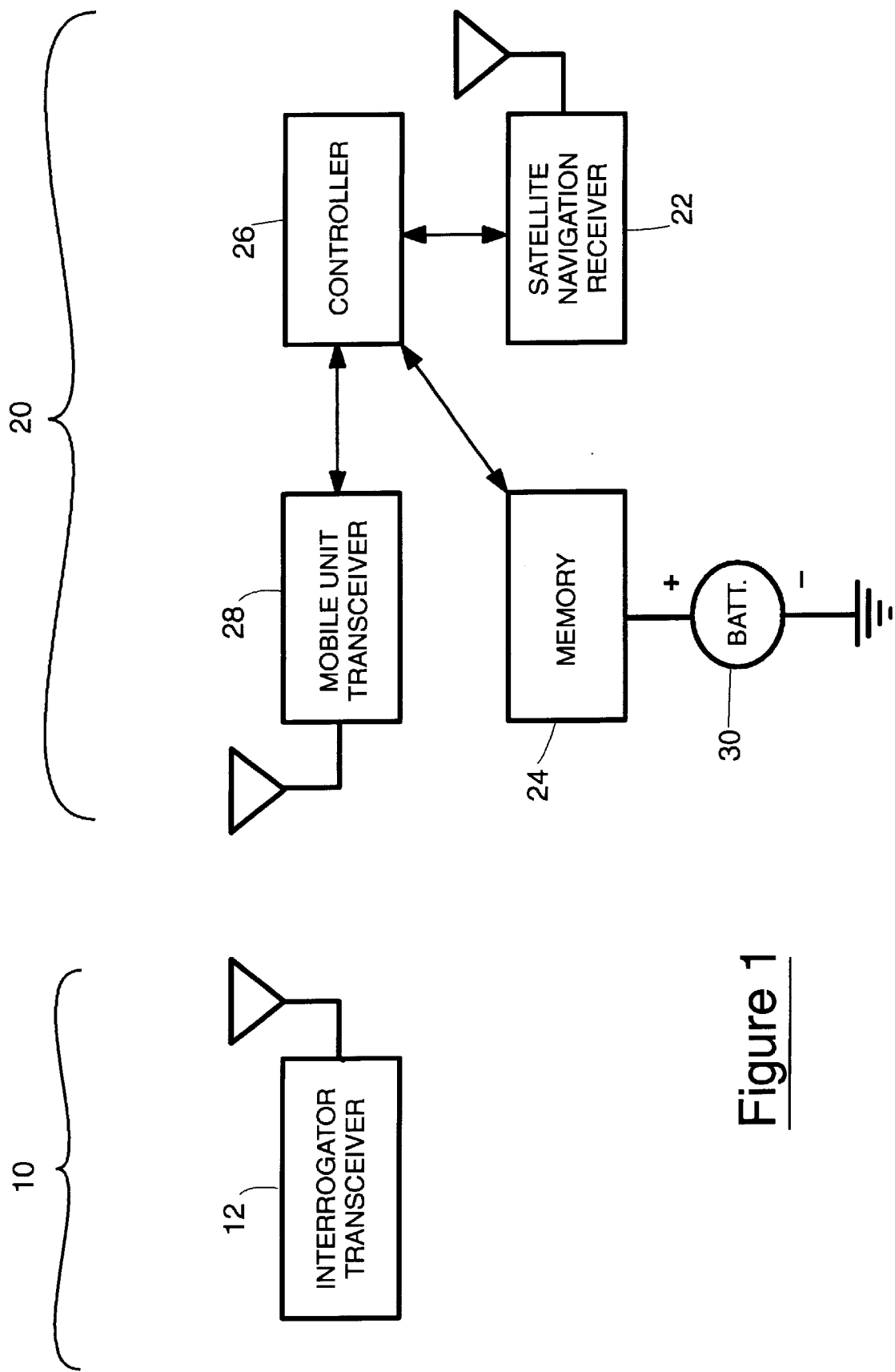
FIG. 1 is a schematic block diagram of an itinerary monitoring system according to the invention.

My itinerary monitoring system includes one or more interrogator stations, each having an interrogator 10, and one or more mobile units, each having a mobile unit navigation system 20.

Each mobile unit can be a vehicle such as a delivery truck or railroad train. Alternatively, a mobile unit can be a valuable asset whose location should be monitored, such as a machine being transported. A mobile unit could even be a person whose travel pattern is to be monitored.

The interrogator station can be a single dispatching center, warehouse, or shipping dock to which the mobile unit returns from time to time. An interrogator 10 can monitor any number of mobile units. For example, the interrogator station may be a central warehouse of a shipping company, and the mobile units may be a large number of delivery trucks which pick up goods from the warehouse in the morning, travel to various customer destinations during the day, and return to the warehouse at night. As each truck returns to the warehouse, the interrogator 10 at the warehouse would interrogate the mobile unit navigation system 20 in the truck to determine the itinerary traveled by the truck since it left the warehouse.

Because the interrogator 10 and mobile unit 20 communicate by radio, there is no need to attach any cable or connector to the mobile unit when it arrives at the interrogator station. In fact, the interrogator transceiver can be implemented in a hand-held wand which an operator holds near the mobile unit while data is being downloaded from the mobile unit to the interrogator transceiver 12. This method of downloading data by radio transmission can be much faster than making a hard-wired connection. Additionally, it can be surreptitious, so that the operator of the mobile unit is unaware that the mobile unit is being monitored.

The monitoring system can include any number of interrogator stations, and the mobile unit can travel from one interrogator station to another interrogator station. It is not even necessary for the mobile unit to stop while it is downloading data to an interrogator station. For example, each interrogator station 10 can be located at a checkpoint which the mobile unit passes while traveling on its itinerary. Such a checkpoint would be especially useful for monitoring train movements along railways, or barge movements down a river. A number of checkpoints can be positioned at intervals along a railway, river route, or major highway, with a complete interrogator station 10 at each checkpoint. All the checkpoints can be linked to a single headquarters station by any conventional data communications link. Each checkpoint can forward to the headquarters station the itinerary data received by the checkpoint interrogator 10 when a mobile unit 20 travels by the checkpoint.

Each mobile unit navigation system 20 includes a conventional satellite navigation receiver 22 which computes the geographic position (typically, global latitude and longitude) of the mobile unit by receiving radio signals from a number of satellites. As is well known, the U.S. Government operates groups of navigation satellites known as G.P.S., Navstar, Argos, and Loran. Economical and compact G.P.S. (Global Positioning System) navigation receivers are readily available commercially from various suppliers such as Trimble and Rockwell. Such satellite receivers 22 typically compute the position of the receiver by well known triangulation algorithms based on the differences in anival times of signals received from three or more G.P.S. satellites.

Each mobile unit navigation system 20 also includes a memory circuit 24, such as a conventional random access memory integrated circuit (I.C.) chip, and a controller circuit 26, such as a conventional microprocessor I.C. chip. At regular intervals, the controller 26 sends a command signal to the navigation receiver 22 directing the receiver to compute its current geographic location based on satellite signals received by the receiver 22. The controller then stores the computed location data and current time in the memory 24. Consequently, the memory 24 accumulates a detailed history of the itinerary of the mobile unit 20.

A transceiver 28 within each mobile unit navigation system 20 performs 2-way radio communication between the mobile unit navigation system 20 and one or more interrogators 10, each of which also has a transceiver 12. Any conventional radio signal modulation scheme and communications protocol may be employed for exchanging commands and data between a mobile unit and a base station. At a minimum, the protocol should include a "download itinerary" command which the interrogator transceiver 12 can send to the mobile unit transceiver 28, in response to which the mobile unit transmits (downloads) to the interrogator all or a specified portion of the itinerary data stored in the memory 24.

In the prototyped preferred implementation, the respective transceivers 12 and 28 in the interrogator and the mobile unit communicate at the standard, unlicensed microwave frequency of 2.45 GHz using spread spectrum modulation to achieve a data transfer rate of 300 Kbits/second. A preferred communications protocol is described in commonly assigned U.S. Pat. No. 5,365,551 to Snodgrass et al., the entire contents of which are hereby incorporated into the present patent specification. Communication at UHF radio frequencies, such as 915 MHz, is a suitable alternative.

In addition to storing the itinerary (geographic position at each point in time) data as just described, the memory 24 stores an identification code which uniquely identifies the mobile unit 20 to the interrogator 10. The identification code can be permanently stored in a non-volatile portion of the memory 24 during manufacture of the system. Alternatively, the identification code for each mobile unit 20 can be chosen by an interrogator 10 and transmitted to the mobile unit 20 for storage in its memory 24. Each mobile unit should transmit its identification code as part of any communications exchange with an interrogator. In the preferred embodiment, the identification code is a four byte (32-bit) binary number, permitting 4.3 billion unique identification codes. The preferred embodiment also includes the capability to append six additional bytes to the identification code to convey additional identifying information such as a 4-byte S.I.C. (Standard Industry Classification) code and a 2-byte specialty code.

Unlike conventional systems in which a base station continuously tracks the position of a mobile unit, in the present invention there is no need for communication between the interrogator and the mobile unit while the mobile unit is away from the interrogator. This eliminates the need for either a large network of RF repeater transceivers or expensive communications over cellular telephone or satellite links.

Furthermore, because the interrogator and mobile unit only have to communicate over a short distance, neither the interrogator transceiver 12 nor the mobile unit transceiver 28 needs a large antenna or a high power RF transmitter as required in many conventional systems. Transmitter power in the milliwatt range is preferred. In fact, the transmitter section of either the interrogator transceiver 12 or the mobile unit transceiver 28 can be a passive transmitter which derives all or most of its operating power from received RF signals, such as a conventional modulated backscatter transmitter, which modulates a received RF signal and reflects it back to the sender. An example of a modulated backscatter transmitter is described in U.S. Pat. No. 4,075,632 issued Feb. 21, 1978 to Baldwin et al.

Eliminating the need for high transmitter power is especially important in applications in which the interrogator 10 or the mobile unit 20 must rely on battery power. One such application is a hand-held interrogator as described earlier. Another battery-powered application is when a mobile unit has no power source of its own, such as when the invention is used to monitor a valuable object or a person. Yet another application for battery power is when the mobile unit navigation system 20 is hidden within a mobile unit, such as a theft protection system installed at a hidden location within an automobile, or a system for covertly or surreptitiously monitoring the itinerary of a delivery truck without the truck driver's knowledge. To prevent detection of the hidden navigation system 20, it is preferable for the navigation system to rely entirely on its internal battery 30 instead of connecting it to the power supply of the mobile unit.

In situations in which a mobile unit is being monitored covertly or surreptitiously (that is, without the knowledge of the operator or custodian of the mobile unit), it is preferable that the mobile unit transceiver 28 never initiates a radio communication, but only transmits a radio signal in response to a command, received from an interrogator, which is specifically addressed to that mobile unit's identification code. Consequently, the number of transmissions from the mobile unit transceiver 28 is minimized, and the identification code makes it difficult for an unauthorized person to initiate a transmission, so that the presence of the mobile unit system 20 will be hard for an unauthorized person to detect. In such covert situations, it also is preferable for the transmitter portion of the mobile unit transceiver 28 to be a modulated backscatter passive transmitter as described earlier. Because such a transmitter does not originate RF energy, but merely reflects back received RF energy, it is difficult to detect by an RF detector ("RF sniffer").

Even when the mobile unit navigation system 20 is receives its primary operating power from the mobile unit, the navigation system 20 preferably includes an internal battery 30 to supply backup power to preserve the data stored in memory 24 in case the primary power to the mobile system 20 is disrupted, either inadvertently or by tampering. If the capacity of the internal battery 30 is only big enough to preserve the memory 24, and not big enough to power the navigation receiver 22, then there will be an absence of geographic position readings stored in memory during the period of the power disruption. When the mobile unit reaches the next base station and downloads its itinerary data to the base station, the gap in the downloaded itinerary data will indicate to the base station when the disruption or tampering occurred.

For compactness, low power consumption, and economy, the memory 24, controller 26, and transceiver 28 preferably are all fabricated on a single monolithic integrated circuit chip. The chip and battery 30 preferably are mounted on a single substrate using the compact mounting techniques described in commonly assigned U.S. Pat. No. 5,448,110 and U.S. Pat. No. 5,497,140 filed Dec. 17, 1995, the entire contents of each of which are hereby incorporated into the present patent specification.

Since the memory 24 can store only a finite number of geographic position data points, old position data eventually must be deleted or overwritten with new data. Preferably, after successfully receiving itinerary data from a mobile unit, the base station will transmit to the mobile unit a "delete" command, in response to which the controller 26 in the mobile unit will permit deletion or overwriting of all existing itinerary data in memory 24 or a specified portion of the data.

In the preferred embodiment, the memory 24 has a capacity of 512 K (kilobytes) and can store 24,000 itinerary readings or data points. In other words, if a geographic position reading were stored in memory 24 every two minutes, it would take over 33 days to fill up the memory. Accordingly, memory overflow would be no problem so long as the mobile unit visits a base station at least once every 33 days to download its itinerary data.

Optionally, a mobile unit can include various sensors in addition to the navigation receiver 22, such as temperature sensors or sensors to indicate the status of various switches, controls, or doors on the mobile unit. The data from the sensors can be stored in memory 24 along with the previously described itinerary data, and similarly can be downloaded by the transceiver 28 to a base station upon command.

Although one advantage of the invention is that it overcomes the need for long range communications, a conventional long range communications link can be employed as an option to permit emergency communications or communications for any other purpose. The invention will still retain the advantage of not requiring such long range link to be employed for continuous or frequent position tracking.

What is claimed is:

1. An itinerary monitoring apparatus attached to a mobile object, comprising:
   a satellite navigation receiver for computing the current geographic position of the mobile object;
   a memory;
   a controller for storing in the memory a plurality of successive itinerary data points at intervals throughout the itinerary of the mobile object, wherein each successive itinerary data point includes a successive position computed by the navigation receiver and a time of day corresponding to that position; and a radio transceiver for receiving and transmitting messages by radio communication, wherein the transceiver transmits an itinerary data message containing a number of the itinerary data points stored in the memory.

2. Apparatus according to claim 1, wherein the transceiver does not transmit any messages containing itinerary data except in response to receiving an interrogation radio message.

3. Apparatus according to claim 2, wherein the transceiver comprises a modulated-backscatter passive RF transmitter for transmitting said itinerary data messages.

4. Apparatus according to claim 2, wherein:

the memory further stores an identification code which identifies the mobile object; and the transceiver does not transmit any messages except in response to receiving an interrogation radio message containing said identification code.

5. An itinerary monitoring apparatus enabling an interrogator to monitor the itinerary of a number of mobile objects, comprising:

(a) at least one interrogator station including a first radio transceiver for transmitting interrogation messages and receiving data messages; and (b) a number of mobile objects, each mobile object being movable away from the interrogator station, wherein each mobile object includes:

(i) a satellite navigation receiver for computing the current geographic position of the mobile object, (ii) a memory, (iii) a controller for storing in the memory a plurality of successive itinerary data points at intervals throughout the itinerary of the mobile object, wherein each successive itinerary data point includes a successive position computed by the navigation receiver and a time of day corresponding to that position, and (iv) a second radio transceiver for receiving and transmitting messages by radio communication, wherein the second transceiver transmits a radio message containing a number of the itinerary data points stored in the memory.

6. Apparatus according to claim 5, wherein the second transceiver in each mobile object does not transmit any messages containing itinerary data except in response to receiving an interrogation radio message from the first transceiver.

7. Apparatus according to claim 6, wherein the second transceiver in each mobile object comprises a modulated-backscatter passive RF transmitter for transmitting said messages containing itinerary data points.

8. Apparatus according to claim 6, wherein:

the memory in each mobile object further stores an identification code which identifies the mobile object;

each interrogation message transmitted by the interrogator station includes the identification code of one of said mobile objects; and the second transceiver in each mobile object does not transmit any radio messages except in response to receiving an interrogation radio message containing the identification code stored in the memory of that mobile object.

9. A method for monitoring the itinerary of a mobile object, comprising the steps of:

the mobile object receiving signals from a navigation satellite;

at regular intervals, the mobile object computing from the received signals the current geographic position of the mobile object;

the mobile object storing in memory a plurality of successive itinerary data points at intervals throughout the itinerary of the mobile object, wherein each successive itinerary data point includes one of said computed positions and a time of day corresponding to that position; and the mobile object transmitting a radio signal containing a number of the itinerary data points stored in the memory.

10. A method according to claim 9, further comprising the step of:

an interrogator station transmitting to the mobile object a radio signal containing an interrogation message;

wherein the mobile object performs said step of transmitting said radio signal only in response to receiving said interrogation message.

11. A method according to claim 10, further comprising the step of:

storing in the memory of the mobile object an identification code which identifies the mobile object;

wherein the step of the interrogator station transmitting an interrogation message includes transmitting an identification code;

wherein the mobile object performs said step of transmitting said radio signal only in response to receiving an interrogation message which includes the identification code of said mobile object; and wherein the mobile object does not transmit any radio signal except in response to receiving an interrogation radio message which includes the identification code stored in the memory of the mobile object.

* * * * *